US008694818B2

(12) United States Patent
Song (10) Patent No.: US 8,694,818 B2
(45) Date of Patent: Apr. 8, 2014

(54) CONTROL CIRCUIT AND OPERATING METHOD THEREOF

(75) Inventor: Choung-Ki Song, Gyeonggi-do (KR)

(73) Assignee: Hynix Semiconductor Inc., Gyeonggi-do (KR)

( * ) Notice: Subject to any disclaimer, the term of this patent is extended or adjusted under 35 U.S.C. 154(b) by 623 days.

(21) Appl. No.: 12/949,194

(22) Filed: Nov. 18, 2010

(65) Prior Publication Data

US 2012/0030497 A1    Feb. 2, 2012

(30) Foreign Application Priority Data

Jul. 30, 2010   (KR) .................. 10-2010-0074061

(51) Int. Cl.
*G06F 1/12*       (2006.01)
*G06F 13/42*      (2006.01)
*H04L 5/00*       (2006.01)
*H04L 7/00*       (2006.01)

(52) U.S. Cl.
USPC ........................................... 713/400

(58) Field of Classification Search
USPC ................................. 713/400, 500
See application file for complete search history.

(56) References Cited

U.S. PATENT DOCUMENTS

| 6,069,508 | A  | * | 5/2000  | Takai .................. 327/161 |
| 6,662,305 | B1 | * | 12/2003 | Salmon et al. .......... 713/401 |
| 7,221,126 | B1 | * | 5/2007  | Williamson et al. ..... 370/503 |
| 7,275,174 | B2 | * | 9/2007  | Cheung et al. .......... 713/500 |
| 7,725,758 | B2 | * | 5/2010  | Link et al. ............ 713/502 |
| 8,143,940 | B2 | * | 3/2012  | Kim et al. ............. 327/539 |
| 2008/0143404 | A1 | * | 6/2008  | Shim .................. 327/158 |
| 2008/0159037 | A1 | * | 7/2008  | Lee et al. ............. 365/208 |
| 2008/0290913 | A1 | * | 11/2008 | Hashimoto et al. ...... 327/145 |
| 2010/0052750 | A1 | * | 3/2010  | Yamane ................ 327/158 |
| 2011/0156778 | A1 | * | 6/2011  | Kim et al. ............. 327/158 |

* cited by examiner

*Primary Examiner* — Mohammed Rehman
(74) *Attorney, Agent, or Firm* — IP & T Group LLP (57) ABSTRACT

A control circuit includes a plurality of clock synchronization units configured to shift an input signal in response to clock signals which are inputted thereto, a selection output block configured to select an output signal from output signals of the plurality of clock synchronization units, and output the selected output signal, and a clock supply block configured to sequentially supply the clock signals to the plurality of clock synchronization units.

9 Claims, 6 Drawing Sheets

CONTROL CIRCUIT AND OPERATING METHOD THEREOF

CROSS-REFERENCE TO RELATED APPLICATIONS

The present application claims priority of Korean Patent Application No. 10-2010-0074061, filed on Jul. 30, 2010, which is incorporated herein by reference in its entirety.

BACKGROUND OF THE INVENTION

Exemplary embodiments of the present invention relate to a semiconductor design technology, and more particularly, to a latency control circuit capable of allowing latency information to be reflected in an input signal and outputting a signal in which the latency information has been reflected.

In general, a semiconductor memory device such as a DDR is SDRAM (Double Data Rate Synchronous DRAM) may set various portions of latency information and perform a predetermined circuit operation according to the latency information. CAS latency is one example of latency information used in a semiconductor memory device. The CAS latency defines a time that elapses until data is outputted after a read command is inputted, and the semiconductor memory device may output data at a desired time point by using the CAS latency after the read command. That is, the semiconductor memory device performs a shifting operation based on the CAS latency after the read command, and outputs data in response to a shifted output signal. Thus, the data is outputted in response to the time point, at which the CAS latency is reflected, after the read command.

Meanwhile, in addition to DDR SDRAM, other semiconductor devices also use latency information that performs a function similar to that of the CAS latency. In the present specification, circuits controlled in response to such latency information will be defined as a latency control circuit.

Figure 1:
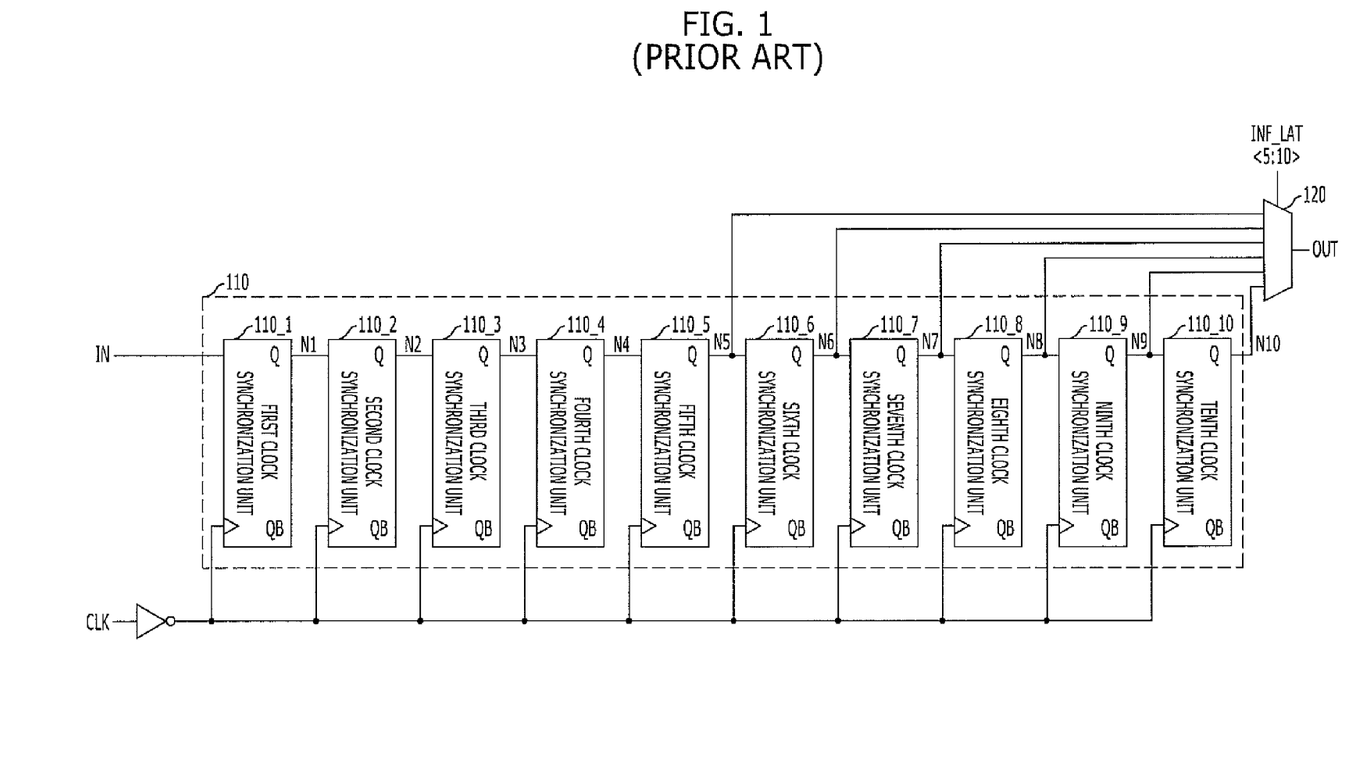
FIG. 1 is a block diagram illustrating a general latency control circuit.

FIG. 1 is a block diagram illustrating a general latency control circuit.

Referring to FIG. 1, the latency control circuit generates an output signal OUT according to latency information INF_LAT<5:10> and an input signal IN, and includes a clock synchronization block 110 and a selection output block 120.

The clock synchronization block 110 shifts an input signal IN in response to a clock signal CLK, and includes first to tenth clock synchronization units 110_1 to 110_10 that output an inputted signal in synchronization with the clock signal CLK. The first clock synchronization unit 110_1 outputs the input signal IN in synchronization with the clock signal CLK, and each of the second to tenth clock synchronization units 110_2 to 110_10 outputs an output signal of a previous clock synchronization unit in synchronization with the clock signal CLK.

The selection output block 120 selects an output signal from the output signals of the fifth to tenth clock synchronization units 110_5 to 110_10 according to the latency information INF_LAT<5:10>, and outputs the selected output signal.

Figure 2:
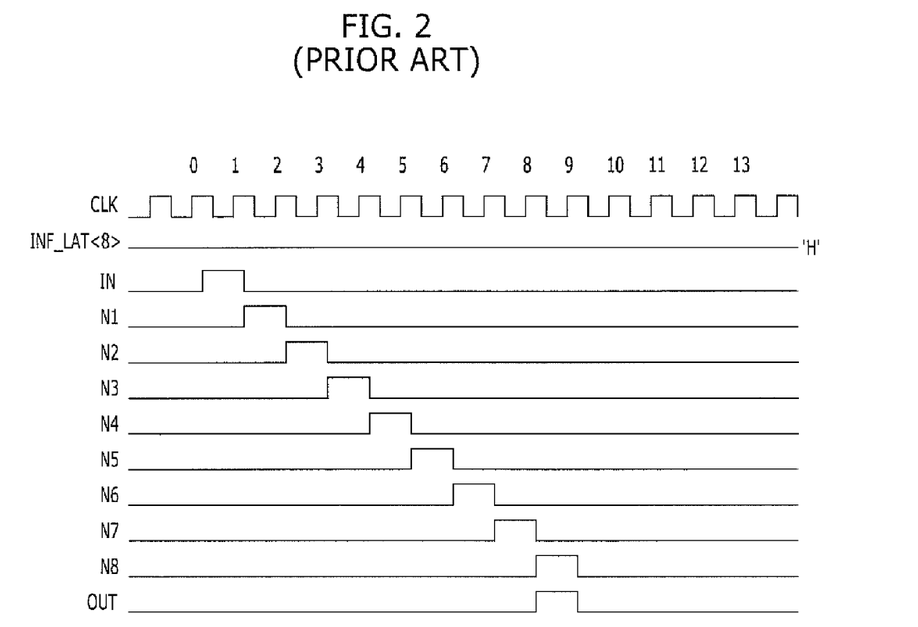
FIG. 2 is a timing diagram illustrating the circuit operation of the latency control circuit illustrated in FIG. 1.

FIG. 2 is a timing diagram illustrating the circuit operation of the latency control circuit illustrated in FIG. 1. For the purpose of convenience, it is assumed that the latency information 'INF_LAT<8>' of the latency information INF_LAT<5:10> is activated to a high level. This represents that the output signal OUT is activated corresponding to the time point at which the clock signal CLK is toggled eight times after the input signal IN is activated.

Referring to FIGS. 1 and 2, if the input signal IN is activated to a signal having a high-level pulse width, the first clock synchronization unit 110_1 outputs the input signal IN as a first output signal N1 in synchronization with the clock signal CLK. The second clock synchronization unit 110_2 outputs the first output signal N1 as a second output signal N2 in synchronization with the clock signal CLK. The third to tenth clock synchronization units 110_3 to 110_10 perform the same operation as that of the second clock synchronization unit 110_2. That is, the third to tenth clock synchronization units 110_3 to 110_10 output signals, which are inputted thereto, as the third to tenth output signals N3 to N10 in synchronization with the clock signal CLK, respectively.

Since the selection output block 120 selects an eighth output signal N8 in response to the latency information 'INF_LAT<8>' of the latency information INF_LAT<5:10>, the output signal OUT of the selection output block 120 is the eighth output signal N8.

As can be seen from FIGS. 1 and 2, the latency control circuit performs a shifting operation with respect to the input signal IN in synchronization with the clock signal CLK, selects a signal corresponding to the latency information INF_LAT<5:10> of the shifted signals as the output signal OUT, and outputs the output signal OUT. As a result, the output signal OUT represents the input signal IN shifted according to the latency information INF_LAT<5:10>.

As described above, the general latency control circuit performs the shifting operation, and receives the clock signal CLK which is toggled for the shifting operation. The first to tenth clock synchronization units 110_1 to 110_10 receiving the clock signal CLK perform the shifting operation according to the toggling of the clock signal CLK. By performing a shifting operation in this manner power is consumed by each of the first to tenth clock synchronization units 110_1 to 110_10.

SUMMARY OF THE INVENTION

Exemplary embodiments of the present invention relate to a latency control circuit in which clock synchronization units perform a shifting operation at the time point at which an input signal is inputted.

In accordance with an exemplary embodiment of the present invention, a control circuit includes a plurality of clock synchronization units configured to shift an input signal in response to clock signals which are inputted thereto, a selection output block configured to select an output signal from output signals of the plurality of clock synchronization units, and output the selected output signal, and a clock supply block configured to sequentially supply the clock signals to the plurality of clock synchronization units.

Specifically, the clock supply block may include a plurality of clock allocation units which correspond to the plurality of clock synchronization units in a one-to-one manner, and allocate the clock signals to corresponding clock synchronization units of the plurality of clock synchronization units in response to a plurality of control signals.

In accordance with another exemplary embodiment of the present invention, a control circuit includes a plurality of clock synchronization units configured to shift an input signal in response to sampling clock signals which are inputted thereto, a selection output block configured to select an output signal from output signals of the plurality of clock synchronization units, and output the selected output signal; and a plurality of clock sampling units configured to sample clock signals for sampling periods defined by signals, which are activated before the signals inputted to the plurality of clock synchronization units are activated, thereby generating the sampling clock signals.

Specifically, the latency control circuit may further include a signal input block for generating the input signal by delaying a source input signal by a certain time.

In accordance with yet another exemplary embodiment of the present invention, a method for operating a control circuit, which has a plurality of clock synchronization units that perform a shifting operation includes shifting an input signal in response to a first clock signal which is toggled for a first activation period defined by the input signal and an output signal of a clock synchronization unit receiving the input signal, shifting an output signal resulting from the shifting of the input signal in response to a second clock signal which is toggled for a second activation period defined by an output signal of a previous clock synchronization unit and an output signal of a clock synchronization unit, which receives the second clock signal, and selecting a shifted signal from a plurality of shifted signals, and outputting the selected signal.

Specifically, the first activation period may be enabled in response to the source input signal and disabled in response to a corresponding output signal resulting from the shifting of the input signal. The second activation period may be enabled in response to a corresponding output bar signal of the previous clock synchronization unit and disabled in response to a corresponding output signal resulting from the shifting of the output signal.

In the latency control circuit in accordance with an exemplary embodiment of the present invention, the clock synchronization units perform a shifting operation at the time point at which an input signal is inputted, and thus, power consumed when outputting the input signal according to latency information may be minimized.

DESCRIPTION OF SPECIFIC EMBODIMENTS

Exemplary embodiments of the present invention will be described below in more detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Throughout the disclosure, like reference numerals refer to like parts throughout the various figures and embodiments of the present invention.

Figure 3:
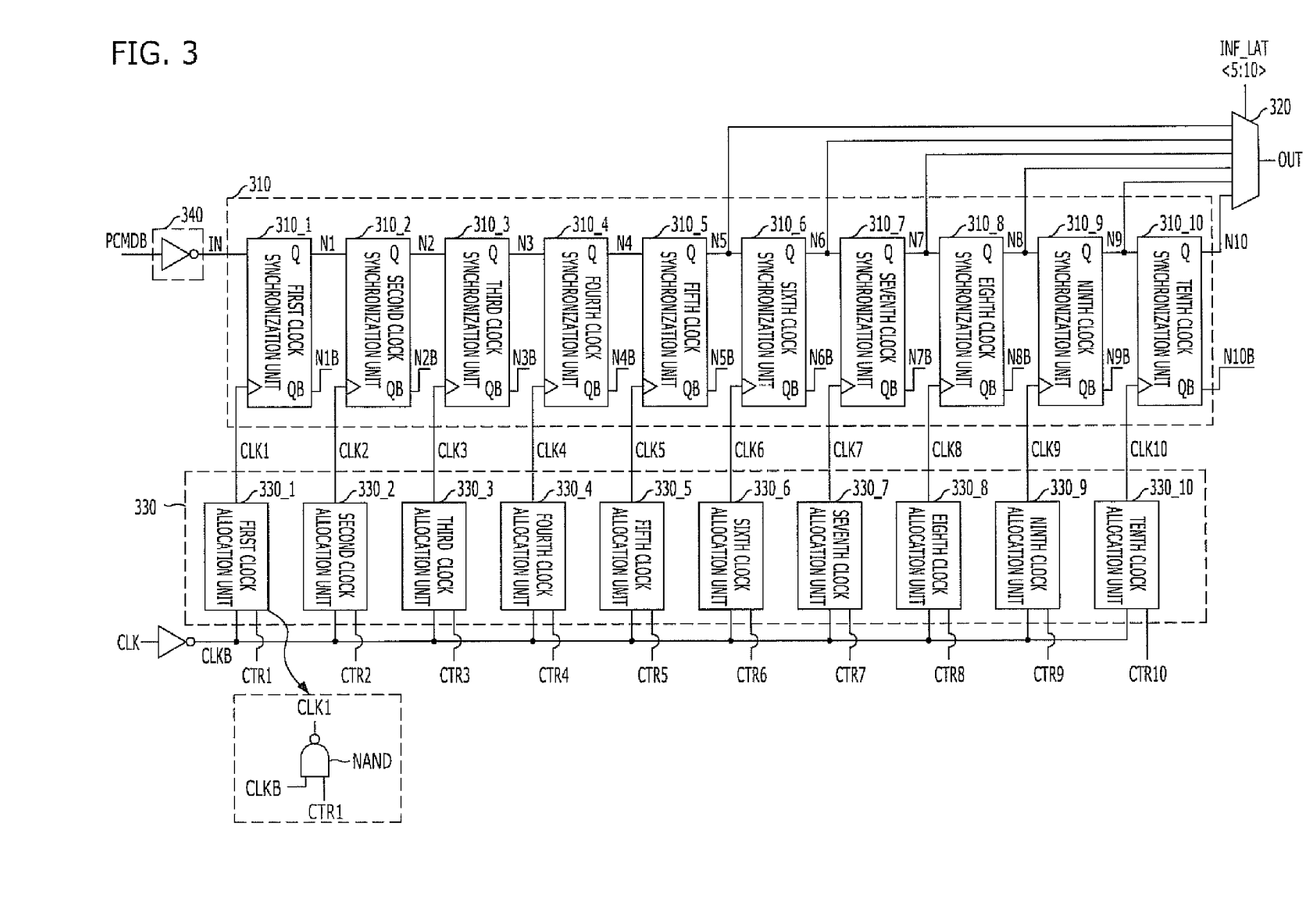
FIG. 3 is a block diagram illustrating a latency control circuit in accordance with an exemplary embodiment of the present invention.

FIG. 3 is a block diagram illustrating a latency control circuit in accordance with an exemplary embodiment of the present invention.

Referring to FIG. 3, the latency control circuit includes a clock synchronization block 310, a selection output block 320, a clock supply block 330, and a signal input block 340.

The clock synchronization block 310 is configured to shift an input signal IN in response to first to tenth sampling clock signals CLK1 to CLK10 which are inputted thereto. The clock synchronization block 310 includes first to tenth clock synchronization units 310_1 to 310_10 that output signals, which are inputted thereto, in synchronization with the first to tenth sampling clock signals CLK1 to CLK10, respectively. The first clock synchronization unit 310_1 is configured to output the input signal IN in synchronization with the first clock signal CLK1, and each of the second to tenth clock synchronization units 310_2 to 310_10 is configured to output an output signal of a previous clock synchronization unit in synchronization with the second to tenth sampling clock signals CLK2 to CLK10, respectively.

The selection output block 320 is configured to select an output signal, which corresponds to latency information INF_LAT<5:10>, from the output signals of the fifth to tenth clock synchronization units 310_5 to 310_10, and output the selected output signal.

The clock supply block 330 is configured to sequentially supply the clock signal CLK to the first to tenth clock synchronization units 310_1 to 310_10, and includes first to tenth clock allocation units 330_1 to 330_10. The first to tenth clock allocation units 330_1 to 330_10 correspond to the first to tenth clock synchronization units 310_1 to 310_10 in a one-to-one manner. The first to tenth clock allocation units 330_1 to 330_10 allocate/transfer the clock signal CLK as the first to tenth sampling clock signals CLK2 to CLK10 to the first to tenth clock synchronization units 310_1 to 310_10 in response to first to tenth sampling control signals CTR1 to CTR10, respectively.

Hereinafter, for the purpose of convenience, the first clock allocation unit 330_1 of the first to tenth clock allocation units 330_1 to 330_10 will be representatively described.

As shown by the inset in FIG. 3, the first clock allocation unit 330_1 may include a NAND gate that receives an inverted clock signal CLKB obtained by inverting the clock signal CLK and the first sampling control signal CTR1 and outputs the first sampling clock signal CLK1. If the first sampling control signal CTR1 is activated to a high level, the inverted clock signal CLKB is outputted as the first sampling clock signal CLK1. In other words, in the period in which the first sampling control signal CTR1 is activated to the high level, the inverted clock signal CLKB is outputted as the first sampling clock signal CLK1, and the first sampling clock signal CLK1 is allocated to the first clock synchronization unit 310_1.

The second to tenth clock allocation units 330_2 to 330_10 have a configuration similar to that of the first clock allocation unit 330_1. Each of the second to tenth clock allocation units 330_2 to 330_10 is configured to output the inverted clock signal CLKB as a corresponding sampling clock signal in the period in which a corresponding sampling control signal is activated, and allocate the corresponding sampling clock signal to a corresponding clock synchronization unit.

In other words, the first to tenth clock allocation units 330_1 to 330_10 may be configured to output the clock signal CLK as the first to tenth sampling clock signals CLK1 to CLK10 in response to the first to tenth sampling control signals CTR1 to CTR10, and allocate the first to tenth sampling clock signals CLK1 to CLK10 to the first to tenth clock synchronization units 310_1 to 310_10, respectively.

The first to tenth sampling control signals CTR1 to CTR10 in accordance with an exemplary embodiment of the present invention are used for controlling the output period of the clock signal CLK. The first to tenth sampling control signals CTR1 to CTR10 may be sequentially activated in response to the input signal IN, and may be sequentially deactivated in response to the output signals N1 to N10 of the first to tenth clock synchronization units 310_1 to 310_10. Specifically, the first to tenth sampling control signals CTR1 to CTR10 may be activated in response to signals, which are activated before the signals inputted to the first to tenth clock synchronization units 310_1 to 310_10 are activated, in consideration of margins of the input signal IN and the clock signal CLK.

In the latency control circuit in accordance with an exemplary embodiment of the present invention, after the first to tenth sampling clock signals CLK1 to CLK10 inputted to the first to tenth clock synchronization units 310_1 to 310_10 are sequentially activated, the first to tenth clock synchronization units 310_1 to 310_10 perform the shifting operation with respect to the input signal IN. That is, at the time point at which the input signal IN is shifted and transmitted to the first to tenth clock synchronization units 310_1 to 310_10, the first to tenth clock synchronization units 310_1 to 310_10 perform the shifting operation. This results in a reduction of power consumption during the shifting operation of the latency control circuit.

The signal input block 340 is configured to receive a source input signal PCMDB and generate the input signal IN. The signal input block 340 may include an inverter that receives the source input signal PCMDB and outputs the input signal IN by delaying the source input signal PCMDB by a certain time. The source input signal PCMDB and the input signal IN are activated at different time points. That is, the input signal IN is activated after the source input signal PCMDB is activated. The signal input block 340 in accordance with an exemplary embodiment of the present invention is configured to control the activation time point of the first sampling control signal CTR1 in consideration of the margins of the clock signal CLK and the input signal IN as described above.

Hereinafter, for the purpose of convenience, a configuration in consideration of the margins of the clock signal CLK and the input signal IN will be mainly described.

Figure 5:
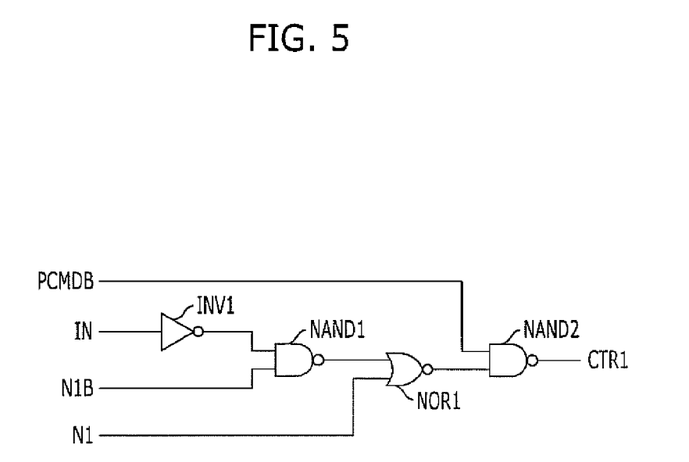
FIG. 5 is a circuit diagram illustrating a first control signal generation unit for generating the first sampling control signal illustrated in FIG. 3.

The first to tenth sampling control signals CTR1 to CTR10 are generated by a control signal generation block (refer to FIG. 5). For the purpose of convenience, the first to tenth clock synchronization units 310_1 to 310_10 will be described in more detail before the control signal generation block is described. Since the first to tenth clock synchronization units 310_1 to 310_10 may have configurations similar to one another, the first clock synchronization unit 310_1 will be representatively described.

Figure 4:
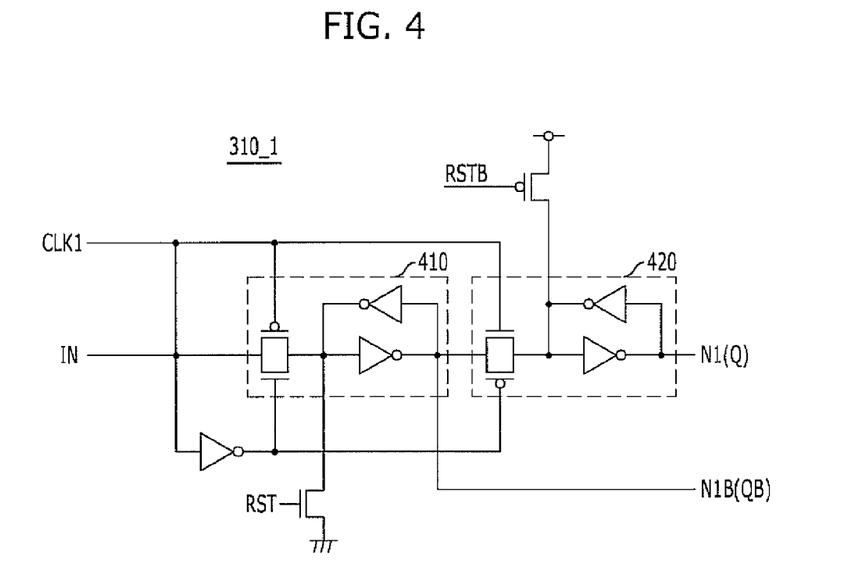
FIG. 4 is a circuit diagram illustrating the first clock synchronization unit illustrated in FIG. 3.

FIG. 4 is a circuit diagram illustrating the first clock synchronization unit 310_1 illustrated in FIG. 3.

Referring to FIG. 4, the first clock synchronization unit 310_1 is configured to output the input signal IN as a first output signal N1 and a first output bar signal N1B in synchronization with the first sampling clock signal CLK1, and includes a first clock latching section 410 and a second clock latching section 420.

The first clock latching section 410 is configured to latch the input signal IN in response to the first sampling clock signal CLK1, and output the latched signal as the first output bar signal N1B. The second clock latching section 420 is configured to latch the first output bar signal N1B, which is the output signal of the first clock latching section 410, in response to the first sampling clock signal CLK1, and output the latched signal as the first output signal N1. Similar to the configuration of the first clock synchronization unit 310_1, the second to tenth clock synchronization units 310_2 to 310_10 are configured to latch signals, which are inputted thereto, in response to corresponding sampling clock signals, and output the latched signals as corresponding output signals and output bar signals.

Hereinafter, a simple circuit operation of the first clock synchronization unit 310_1 will be described. For the purpose of convenience, it is assumed that the first sampling clock signal CLK1 is toggled by the first sampling control signal CTR1.

The first clock latching section 410 is configured to latch the input signal IN in response to the falling edge of the first sampling clock signal CLK1, and output the latched signal as the first output bar signal Nib. The second clock latching section 420 is configured to latch the first output bar signal N1B in response to the rising edge of the first sampling clock signal CLK1, and output the latched signal as the first output signal N1.

The latency control circuit in accordance with an exemplary embodiment of the present invention further includes the control signal generation block that generates the first to tenth sampling control signals CTR1 to CTR10 for controlling the output periods of the first to tenth sampling clock signals CLK1 to CLK10 which are outputted from the first to tenth clock allocation units 330_1 to 330_10. Hereinafter, a first control signal generation unit for generating the first sampling control signal CTR1 and a second control signal generation unit for generating the second sampling control signal CTR2 will be representatively described. Since the second control signal generation unit has a configuration similar to those of third to tenth control signal generation units for generating third to tenth sampling control signals CTR3 to CTR10, detailed description of the circuit configurations of the third to tenth control signal generation units will be omitted.

FIG. 5 is a circuit diagram illustrating the first control signal generation unit for generating the first sampling control signal CTR1 illustrated in FIG. 3.

Referring to FIG. 5, the first control signal generation unit includes a first inverter INV1, a first NAND gate NAND1, a first NOR gate NOR1, and a second NAND gate NAND2. The first inverter INV1 is configured to receive and invert the input signal IN. The first NAND gate NAND1 is configured to receive the output signal of the first inverter INV1 and the first output bar signal N1B. The first NOR gate NOR1 is configured to receive the output signal of the first NAND gate NAND1 and the first output signal N1. The second NAND gate NAND2 is configured to receive the source input signal PCMDB and the output signal of the first NOR gate NOR1 and output the first sampling control signal CTR1.

Figure 6:
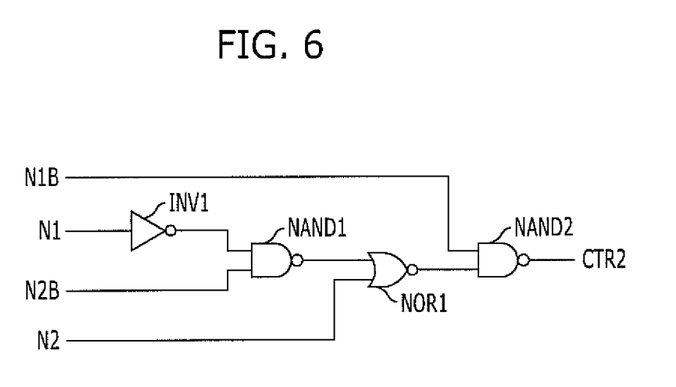
FIG. 6 is a circuit diagram illustrating a second control signal generation unit for generating the second sampling control signal illustrated in FIG. 3.

FIG. 6 is a circuit diagram illustrating the second control signal generation unit for generating the second sampling control signal CTR2 illustrated in FIG. 3, and is substantially identical to the circuit configuration illustrated in FIG. 5, except that different signals are inputted. That is, the first output bar signal N1B is inputted instead of the source input signal PCMDB, the first output signal N1 is inputted instead of the input signal IN, a second output bar signal N2B is inputted instead of the first output bar signal N1B, and a second output signal N2 is inputted instead of the first output signal N1.

The third to tenth control signal generation units have a configuration substantially identical to that of the second signal generation unit, except that different signals are inputted for each. Accordingly, the second to tenth control signal generation units correspond to the second to tenth clock synchronization units 310_2 to 310_10 in a one-to-one manner. Each of the second to tenth control signal generation units is configured to generate a corresponding control signal in response to an output signal and an output bar signal, which are outputted from a previous clock synchronization unit, and an output signal and an output bar signal, which are outputted from a clock synchronization unit which corresponds to each of the second to tenth control signal generation units.

The first to tenth sampling clock signals CLK1 to CLK10 are obtained by sampling the clock signal CLK in response to the first to tenth sampling control signals CTR1 to CTR10, respectively, which will be described with reference to FIG. 7. In other words, the first to tenth control signal generation units and the first to tenth clock allocation units 330_1 to 330_10, which correspond to the first to tenth control signal generation units, may form pairs, thereby forming a plurality of clock sampling units. The plurality of clock sampling units perform a sampling operation with respect to the clock signal CLK for sampling periods defined by the first to tenth sampling control signals CTR1 to CTR10, thereby generating the first to tenth sampling clock signals CLK1 to CLK10.

Figure 7:
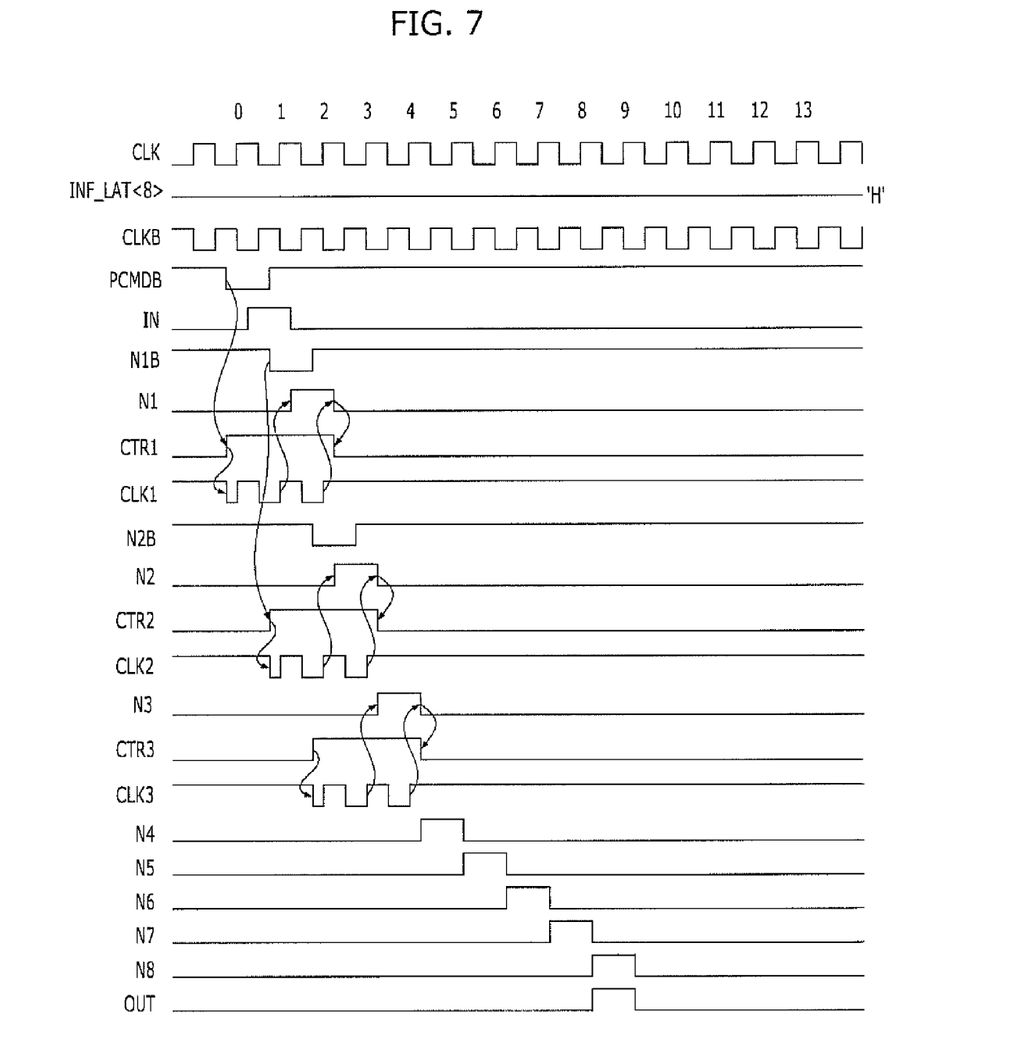
FIG. 7 is a timing diagram illustrating the circuit operation of the latency control circuit illustrated in FIG. 3.

FIG. 7 is a timing diagram illustrating the circuit operation of the latency control circuit illustrated in FIG. 3. For the purpose of convenience, it is assumed that the latency information 'INF_LAT<8>' of the latency information INF_LAT<5:10> is activated. This represents that an output signal OUT is activated corresponding to the time point at which the clock signal CLK is toggled eight times after the input signal IN is activated.

Referring to FIGS. 3 to 7, the source input signal PCMDB is a signal having a low-level pulse width. Therefore, the input signal IN, obtained by inverting the source input signal PCMDB, is a signal having a high-level pulse width.

The first control signal generation unit (refer to FIG. 5) is configured to change the first sampling control signal CTR1 from a low level to a high level in response to the source input signal PCMDB which is activated before the input signal IN is activated. That is, the first sampling control signal CTR1 is activated. Thus, the first clock allocation unit 330_1 is configured to invert the inverted clock signal CLKB in response to the first sampling control signal CTR1, and output the first sampling clock signal CLK1. The first sampling clock signal CLK1 is toggled, and thus, the first clock synchronization unit 310_1 performs the shifting operation. The first clock synchronization unit 310_1 generates the first output signal N1 and the first output bar signal N1B as a result of the shifting operation.

The first sampling control signal CTR1 is substantially maintained at the high level in response to the input signal IN and the first output bar signal N1B, and is changed to a low level from the high level in response to the first output signal N1. That is, the first sampling control signal CTR1 is deactivated. If the first sampling control signal CTR1 is changed to the low level, the first clock allocation unit 330_1 does not allocate the inverted clock signal CLKB to the first clock synchronization unit 310_1. In other words, the first sampling clock signal CLK1 is not toggled, and thus, the first clock synchronization unit 310_1 does not perform the shifting operation. As a result, the first sampling clock signal CLK1 is toggled only for the period in which the first sampling control signal CTR1 is at the high level. Accordingly, the first clock synchronization unit 310_1 performs the shifting operation for the period in which the first sampling control signal CTR1 is at the high level.

Similarly, the second sampling control signal CTR2 is changed to a high level from a low level in response to the first output bar signal N1B, which is activated before the first output signal N1 is activated, and is changed to the low level from the high level in response to the second output signal N2. In other words, the second sampling clock signal CLK2 is toggled only for the period in which the second sampling control signal CTR2 is at the high level. Accordingly, the second clock synchronization unit 310_2 performs the shifting is operation for the period in which the second sampling control signal CTR2 is at the high level.

Similarly, the third to tenth clock synchronization units 310_3 to 310_10 are configured to sequentially receive the third to tenth sampling clock signals CLK3 to CLK10 in response to the third to tenth sampling control signals CRT3 to CTR10, respectively. Thus, the third to tenth clock synchronization units 310_3 to 310_10 sequentially perform the shifting operation in response to the corresponding third to tenth sampling clock signals CLK3 to CLK10 which are sequentially toggled.

As described above, in the latency control circuit in accordance with an exemplary embodiment of the present invention, the first to tenth sampling clock signals CLK1 to CLK10 are sequentially activated and inputted to the first to tenth clock synchronization units 310_1 to 310_10, respectively. Consequently, the first to tenth clock synchronization units 310_1 to 310_10 receive clock signals which are toggled only for the period in which they have to perform the shifting operation. Accordingly, the first to tenth clock synchronization units 310_1 to 310_10 consume power only for the period in which they perform the shifting operation. As a result, in the latency control circuit in accordance with an exemplary embodiment of the present invention, power consumed during the shifting operation may be minimized.

In accordance with an exemplary embodiment of the present invention, power consumed when latency information is reflected in an input signal may be minimized.

While the present invention has been described with respect to the specific embodiments, it will be apparent to those skilled in the art that various changes and modifications may be made without departing from the spirit and scope of the invention as defined in the following claims.

Furthermore, in the above description, a latency control circuit has been described as an example. However, the present invention can also be applied to a shifting circuit for shifting an input signal, as well as the latency control circuit. In addition, the positions and type of logic gates and transistors exemplified above may be changed according to the polarity of an inputted signal.

What is claimed is:
1. A control circuit comprising;
   a plurality of clock synchronization units configured to shift an input signal in response to sampling clock signals which are inputted thereto;
   a selection output block configured to select an output signal from output signals of the plurality of clock synchronization units, and output the selected output signal; and
   a plurality of clock sampling units configured to sample clock signals for sampling periods defined by signals, which are activated before the signals inputted to the plurality of clock synchronization units are activated, thereby generating the sampling clock signals, wherein the plurality of clock sampling units supplies the sampling clock signals to the plurality of clock synchronization units in response to a plurality of sampling control signals to control output periods of the sampling clock signals, wherein the plurality of clock sampling units correspond to the plurality of clock synchronization units in a one-to-one manner and comprise:

a first clock sampling unit configured to sample the clock signal for a sampling period defined by a source in signal and an output signal of a first clock synchronization unit corresponding to the first clock sampling unit, thereby generating a first sampling clock signal; and at least one clock sampling unit configured to sample the clock signal for a sampling period defined by an output signal of a previous clock synchronization, unit and an output signal of a corresponding clock synchronization unit corresponding to the at least one clock sampling unit, thereby generating a corresponding sampling clock signal.

2. The control drain of claim 1, further comprising a signal input block configured to generate the input signal by delaying the source input signal by a certain time.

3. The control circuit of claim 2, wherein each of the plurality of clock synchronization units comprises:

first clock latching section configured to latch an inputted signal in response to a corresponding sampling clock signal and output an output bar signal; and a second clock latching section configured to latch the output bar signal in response to the corresponding sampling clock signal and output an output signal.

4. The control circuit of claim 2, wherein the first clock sampling unit comprises:

a first control signal generation unit configured to generate a first sampling control signal in response to the source input signal and an output signal of the first clock synchronization unit; and a first clock allocation unit configured to output the clock signal as the first sampling clock signal in response to the first sampling control signal, and allocate the first sampling clock signal to the first clock synchronization unit.

5. The control circuit of claim 4, wherein the first sampling control signal is activated in response to the source input signal and deactivated in response to the output signal of the first clock synchronization unit.

6. The control circuit of claim 4, wherein an activation period of the first sampling control signal is controlled by an output bar signal outputted from the first clock synchronization unit and the input signal.

7. The control circuit of claim 2, wherein the at least one clock sampling unit comprises:

a control signal generation unit configured to generate a corresponding sampling control, signal in response to the output signal of the previous clock synchronization unit and the output signal of the corresponding clock synchronization unit; and a clock allocation unit configured to output the clock signal as the corresponding sampling clock signal in response to the corresponding sampling control signal, and allocate the corresponding sampling clock signal to a corresponding clock synchronization unit.

8. The control circuit of claim 7, wherein the corresponding sampling control signal is activated in response to the output signal of the previous clock synchronization unit and deactivated in response to the output signal of the corresponding clock synchronization unit.

9. The control circuit of claim 7, wherein an activation period of the corresponding sampling control signal is controlled by an output bar signal outputted front the corresponding clock synchronization unit and an output signal generated by the previous clock synchronization unit.

* * * * *